June 5, 1951          L. ROMANI          2,555,862
HIGH-LIFT APPLIANCE FOR LARGELY SWEPTBACK WINGS
Filed May 20, 1948          2 Sheets-Sheet 1
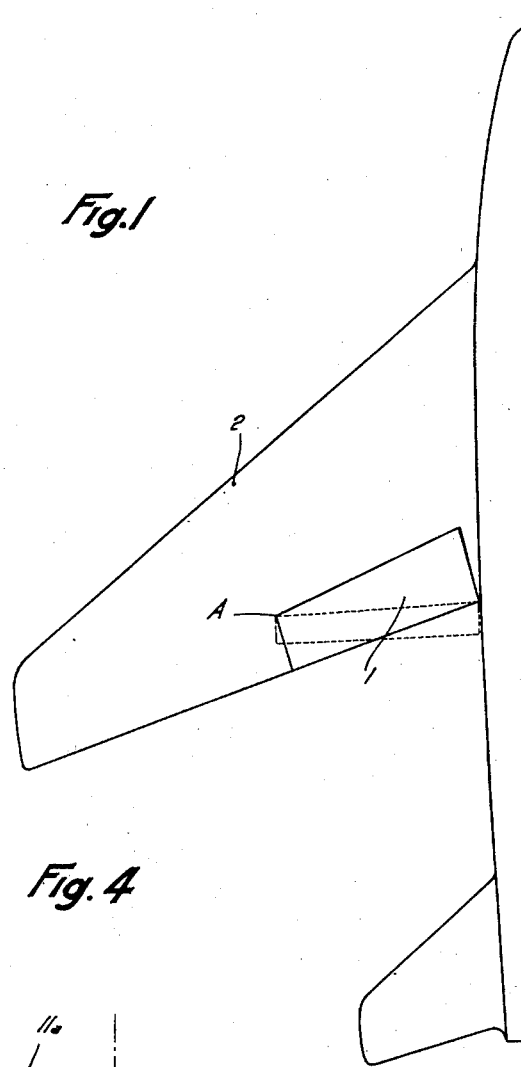
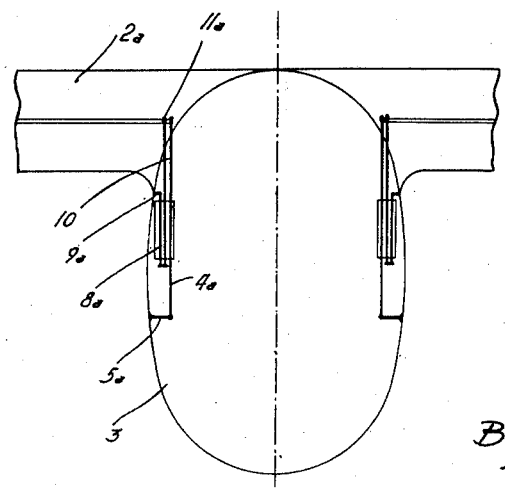
Inventor:
LUCIEN ROMANI
By: [signature]
Attorney Patented June 5, 1951

2,555,862

UNITED STATES PATENT OFFICE 2,555,862

HIGH-LIFT APPLIANCE FOR LARGELY SWEPTBACK WINGS

Lucien Romani, Paris, France, assignor to Office National d'Etudes et de Recherches Aeronautiques, Paris, France Application May 20, 1948, Serial No. 28,175
In France May 23, 1947

3 Claims. (Cl. 244—42)

My invention relates to high-lift appliances. It aims essentially in obtaining an efficacious high-lifting of largely swept-back wings. Up to now, the application of the known high-lift appliances to such types of wings, has not, as a matter of fact, given satisfactory results: in particular it has been experienced that the swept-back of a flap is unfavourable to procuring high lifts. With a view to coping with this drawback, at least partly, the high-lift appliance for swept-back wings which is the subject-matter of my invention, is of the known type with high-lift flaps, which simultaneously swing downwardly under the trailing edge of the wing and move backwardly, and it is notably outstanding in that the back motion of each flap is not the same from one part to the other of the wing, but decreases from the wing-root towards its tip, the flap thus coming into a position, or nearly, in which it is fairly perpendicular to the symmetrical plane of the aircraft. The sweep-back is then nil, or in any case, lower than that of the wing. In another connection its back motion stroke is at a maximum in the vicinity of the wing where the chord is greatest. The usual counter-part of the back motion of the flaps, to wit: the increase of the diving moment is neutralized owing to the fact that it is the front portion of the wing which is the most highly lifted (causing in opposition a cambering moment).

It is furthermore preferable that the operating mechanism be self-compensated, that is to say arranged so that it may cause the aerodynamical action on the flap to produce, in addition to the usual back-moving effort, a swinging effort on said flap. Such a mechanism has the special advantage of reducing, in a large measure, the effort to be produced to swing the flap, and, as a result, in reducing the sizes of the operating members.

Various contrivances may be conceived to ensure the unequal back motion of the movable flap. In an advantageous and not at all limitative embodiment, the end of the flap which is the furthermost from the axis of the aircraft is pivoted to the wing by means of a knuckle or universal joint fixed to the wing, whilst its opposite end is supported and controlled by an operating mechanism attached preferably on the upper surface of the flap on the front and rear corners of said opposite end. This mechanism is preferably housed in the flank of the fuselage. Thus there is no control in the wing.

The self-compensated operating mechanism may advantageously be composed of a system of rods including a rod stationary pivoted at one end and hinged at the other end on the rear corner of the flap, and a system of three other rods hinged respectively: one on the above mentioned rod, a second in a fixed point, and a third on the front corner of said flap, two of these last three rods being further hinged on each other, and the third one on one of these last two rods. This last mentioned connection between the three rods is preferably ensured by a common hinging connecting their ends. According to whether the aircraft is low winged or high winged said rod system is placed higher or lower than the flap.

A supporting and control appliance thus constituted, is simple and rugged; it does not include any slide for the flap.

By way of non limitative example, two embodiments of my invention are shown on the accompanying drawing.

In this drawing:

Fig. 1 is a half view in plan of an aircraft with swept-back wings provided with a high-lift flap, according to the invention.

Fig. 4 is a diagrammatic cross-section of Fig. 3, substantially according to line IV—IV.

Figure 2:
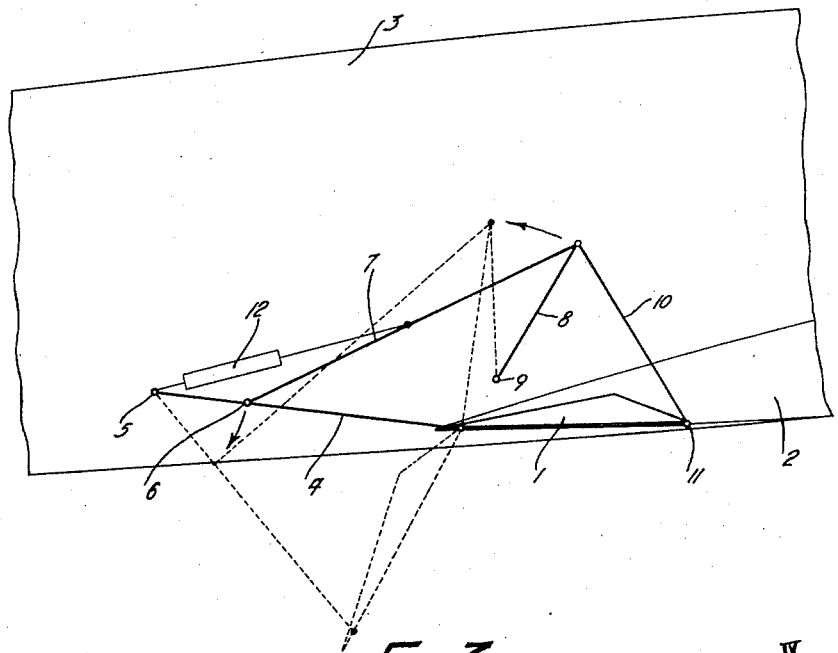
Fig. 2 is, on a larger scale, a corresponding profile view showing diagrammatically an operating mechanism of the flap in the case of a low-winged aircraft.

On Fig. 1 the high-lift flap 1 is shown by full lines in the position where it is retracted (out of operation) and by dotted lines in that of operation. It will be seen on Fig. 1 and Figs. 2 and 3 that when it is retracted it forms the lower surface of the trailing edge of the wing 2, 2a on a portion of the span of the latter from the fuselage 3; it is thus oblique on the axis of the aircraft. When in operative position it is fairly perpendicular to the symmetrical plane of the aircraft, by turning about its front corner A, the furthermost from the fuselage, said corner being fixed on the wing. Said high-lift flap 1 is supported, at corner A, by a knuckle or universal joint, not shown, fixed to the wing, and at its opposite tip by a set of hinged rods (Figs. 2 and 3) housed in the fuselage and located higher (Fig. 2) or lower (Figs. 3 and 4) than the flap, according to whether the aircraft is low or high winged. In both cases, the rear portion of flap 1 is hinged at the end of a rod 4 (Fig. 2), 4a (Fig. 3) hinged at a fixed point 5 (Fig. 2), 5a (Fig. 3) of the fuselage. At an intermediary point of rod 4, 4a is attached by a hinge 6 (Fig. 2), 6a (Fig. 3), a rod 7 (Fig. 2), 7a (Fig. 3) hinged to the end of a rod or crank 8 (Fig. 2), 8a (Fig. 3) the pivoting axis 9 (Fig. 2), 9a (Fig. 3) of which is fixed on the fuselage. On said end of the crank 8, 8a, is furthermore hinged a rod 10 (Fig. 2), 10a (Fig. 3) whose other end is connected by a hinging 11 (Fig. 2), 11a (Fig. 3) to the front corner of the flap 1.

In the case of low wing (Fig. 2), the rod 4 is directed backwardly and a jack 12 is attached between the fixed point 5 and the rod 7, whilst in the case of the high wing (Fig. 3) the rod 4a is directed obliquely downwardly and forwardly and the jack 12a attached on rod 4a, takes support on the fixed point 9a.

Figure 3:
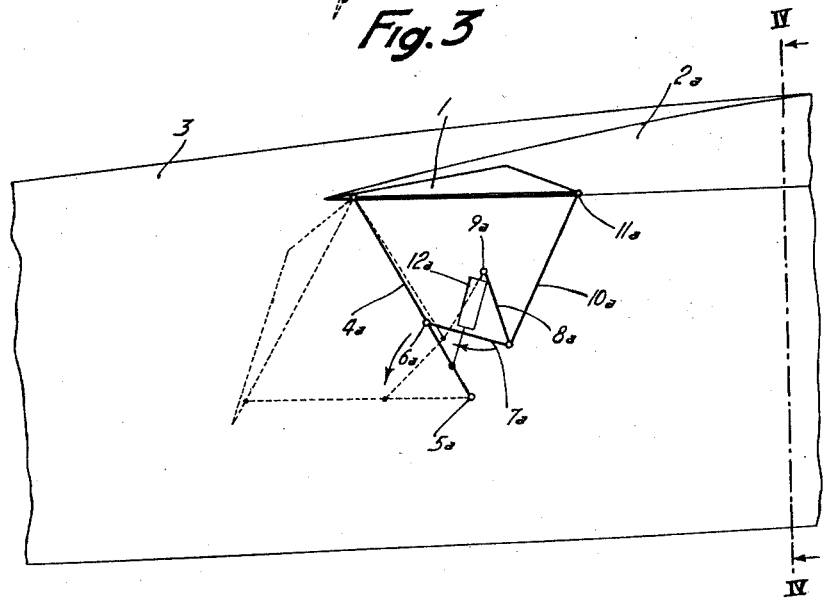
Fig. 3 is a view similar to Fig. 2 except that it shows an operating mechanism of the flap in the case of a high-winged aircraft.

The operation in each case, under the action of jack 12 or 12a, will be easily understood from Figs. 2 and 3 in which is shown by dotted lines, the position of the mechanism when flap 1 is fully swung down. It is clear that the aerodynamical action on the flap 1 as soon as it is moved away from the position where it is completely retracted, has the effect of urging the rods 4 and 8 to turn, or 4a and 8a, in the direction of the swinging down of the flap. The mechanism is accordingly self-compensated and there is only a differential action to overcome to swing down the flap.

Of course my invention is not limited to the details of embodiment shown or described, which has merely been given by way of example. Thus, the control jacks may be replaced by any other suitable appliance: winch, screw, etc. The operating mechanism may also be used to actuate high-lift flaps of the ordinary sliding type, without fixed point, assembled on any kind of wings.

What I claim is:

1. In an airplane, wings having sweepbacks at their leading and trailing edges of at least 20° from a plane normal to the longitudinal axis of the airplane, a high lift flap at the trailing edge of each of said wings, universal means supporting the outer end of said flap, means supporting the root end of said flap for rotatable movement rearwardly and downwardly relative to the wing between an inoperative position, in which the trailing edge of said flap is coincident with that of the related wing and the angle of incidence of said flap is the same as that of said related wing, and an operative position, in which said trailing edge of said flap is substantially normal to said longitudinal axis of the airplane and the angle of incidence of said flap is substantially greater than that of said related wing, and control means operative to selectively displace said flaps between said operative and inoperative positions.

2. In an airplane, wings having sweepbacks at their leading and trailing edges of at least 20° from a plane normal to the longitudinal axis of the airplane, a high flap at the trailing edge of each of said wings, universal means connecting the leading edge of the outer end of said flap to the related wing, means supporting the root end of said flap for rotatable movement rearwardly and downwardly relative to the wing between an inoperative positions, in which the trailing edge of said flap is coincident with that of the related wing and the angle of incidence of said flap is substantially the same as that of said related wing, and an operative position, in which said trailing edge of said flap is substantially normal to said longitudinal axis of the airplane and the angle of incidence of said flap is substantially greater than that of said related wing, and control means operative to selectively displace said flaps between said operative and inoperative positions.

3. In an airplane, wings having sweepbacks at their leading and trailing edges of at least 20° from a plane normal to the longitudinal axis of the airplane; a high-lift flap at the trailing edge of each of said wings and extending outwardly from the root of the latter; universal means on each wing supporting the outer end of the related flap at the leading edge of the latter; support means for the root end of said flap including an arm mounted at one end on a fixed pivot, a link pivotally connected at one end to the free end of said arm and at its other end of said root end of the flap at the leading edge of the latter, a second arm mounted at one end on a fixed pivot and pivotally connected at its other end to said root end of said flap adjacent the trailing edge of the latter, and a connecting rod pivotally connected at its opposite ends between the first mentioned arm and said second arm so that the arms swing in counter directions, and control means swinging said arms to rotate said flap rearwardly and downwardly relative to the wing between an inoperative position within the confines of the trailing edge portion of the related wing and an operative position wherein said flap is substantially normal to said longitudinal axis of the airplane and has an angle of incidence greater than that of the related wing.

LUCIEN ROMANI.

REFERENCES CITED

The following references are of record in the file of this patent:

UNITED STATES PATENTS

| Number | Name | Date |
|---|---|---|
| 2,137,879 | Ksoll | Nov. 22, 1938 |
| 2,243,885 | Schweisch | June 3, 1941 |

FOREIGN PATENTS

| Number | Country | Date |
|---|---|---|
| 454,556 | Great Britain | Sept. 28, 1936 |
| 525,013 | Great Britain | Aug. 20, 1940 |
| 737,052 | France | Sept. 27, 1932 |